United States Patent
Bartel et al.

(10) Patent No.: US 10,939,616 B2
(45) Date of Patent: Mar. 9, 2021

(54) HEIGHT ADJUSTMENT FOR A MOWER

(71) Applicant: Excel Industries, Inc., Hesston, KS (US)

(72) Inventors: Harlan John Bartel, Newton, KS (US); Brian R. Funk, Goessel, KS (US); Brian Lee Nebel, Hesston, KS (US); Robert C. Esau, Hesston, KS (US)

(73) Assignee: EXCEL INDUSTRIES, INC., Hesston, KS (US)

( * ) Notice: Subject to any disclaimer, the term of this patent is extended or adjusted under 35 U.S.C. 154(b) by 473 days.

(21) Appl. No.: 15/809,765

(22) Filed: Nov. 10, 2017

(65) Prior Publication Data

US 2018/0132418 A1  May 17, 2018

Related U.S. Application Data

(60) Provisional application No. 62/421,091, filed on Nov. 11, 2016.

(51) Int. Cl.
| | |
|---|---|
| *A01D 34/00* | (2006.01) |
| *A01D 34/74* | (2006.01) |
| *A01D 34/64* | (2006.01) |
| *A01D 34/82* | (2006.01) |
| *A01D 69/02* | (2006.01) |
| *A01D 101/00* | (2006.01) |

(52) U.S. Cl.
CPC ............ *A01D 34/74* (2013.01); *A01D 34/64* (2013.01); *A01D 34/824* (2013.01); *A01D 69/02* (2013.01); *A01D 2101/00* (2013.01)

(58) Field of Classification Search
USPC .................................................. 56/17.1, 15.2
See application file for complete search history.

(56) References Cited

U.S. PATENT DOCUMENTS

| | | | | |
|---|---|---|---|---|
| 2,354,576 A | * | 7/1944 | Clark | A01D 34/42 280/2 |
| 2,705,393 A | | 4/1955 | Cofer | |
| 3,537,720 A | * | 11/1970 | Irgens | A01D 34/63 280/43 |
| 4,785,612 A | * | 11/1988 | Morishita | A01D 34/69 56/11.8 |
| 4,811,552 A | * | 3/1989 | Fujimoto | A01D 34/69 464/139 |
| 5,020,310 A | * | 6/1991 | Oshima | A01D 34/74 56/17.2 |
| 5,065,568 A | * | 11/1991 | Braun | A01D 34/64 56/14.9 |

(Continued)

OTHER PUBLICATIONS

International Preliminary Report on Patentability dated May 23, 2019 in International Patent Application No. PCT/US2017/061140, 7 pages.

(Continued)

*Primary Examiner* — Thomas B Will
*Assistant Examiner* — Mai T Nguyen
(74) *Attorney, Agent, or Firm* — Shook, Hardy & Bacon, LLP (57) ABSTRACT

Aspects hereof relate to a mower having a first portion and a second portion that is movable relative to the first portion to adjust a cutting height of the mower. The adjustment of the second portion may be facilitated, for example, by a height adjustment mechanism.

20 Claims, 8 Drawing Sheets

(56) References Cited

U.S. PATENT DOCUMENTS

| | | | | |
|---|---|---|---|---|
| 5,398,489 | A * | 3/1995 | Oshima | A01D 34/68 |
| | | | | 56/17.2 |
| 6,490,849 | B1 * | 12/2002 | Scag | A01D 34/001 |
| | | | | 56/10.8 |
| 6,560,952 | B2 * | 5/2003 | Velke | A01D 34/6806 |
| | | | | 280/32.7 |
| 9,499,199 | B1 * | 11/2016 | Laymon | B62D 11/04 |
| 10,091,936 | B2 * | 10/2018 | Laurin | A01D 69/03 |
| 2001/0001170 | A1 | 5/2001 | Velke et al. | |
| 2002/0011059 | A1 | 1/2002 | Moore | |
| 2007/0039304 | A1 | 2/2007 | Wright et al. | |
| 2008/0229725 | A1 | 9/2008 | Shaffer et al. | |
| 2017/0150681 | A1 * | 6/2017 | Hoppel | A01D 42/08 |
| 2017/0265394 | A1 * | 9/2017 | Hoppel | F04B 23/02 |

OTHER PUBLICATIONS

International Search Report and Written Opinion dated Jan. 18, 2018 in International Patent Application No. PCT/US2017/061140, 8 pages.

* cited by examiner

HEIGHT ADJUSTMENT FOR A MOWER

CROSS-REFERENCE TO RELATED APPLICATIONS

The present application claims priority to U.S. Provisional App. No. 62/421,091, filed Nov. 11, 2016 and entitled "Powered Height Adjustment for a Mower." The entirety of the aforementioned application is incorporated by reference herein.

FIELD

Aspects provided herein relate to a mower. More particularly, aspects herein relate to a mower with a first portion and a second portion that is movable relative to the first portion to adjust a cutting height of the mower.

SUMMARY

Aspects hereof relate to a mower, which may be a stand-on mower, that includes a first portion and a second portion that is movable relative to the first portion through a range of operating positions. The first portion may include, for example, a frame, a pair of rear wheels, and an operator platform. The second portion may include, for example, a mowing deck and a power source. The power source may supply power to an output shaft (which may also be referred to as a powered-drive element) that is drivingly engaged with the rear wheels, for example, via a rear-drive element. The mower may also include a drive linkage rotatably coupled with the first portion and the second portion, such that the drive linkage maintain a fixed distance between the first portion and the second portion. In one aspect, the drive linkage may be coupled with the first portion at a rear-drive element rotational axis and with the second portion at a powered-drive element rotational axis. Accordingly, the second portion may be movable about an arc having an origin at the rear-drive element rotational axis.

Additional aspects hereof relate to a height adjustment mechanism, which may facilitate movement of the second portion about the arc to adjust a cutting height of the mower. In some aspects, the height adjustment mechanism includes a height adjustment control and a height adjustment linkage. The height adjustment control may comprise a lever, a button, a selector, an actuator, or other suitable means for controlling height adjustment. The height adjustment control may be coupled with the height adjustment linkage, which may be coupled with the first portion and the second portion (and/or the drive linkage). In some aspects, the height adjustment linkage and the drive linkage form a parallel linkage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other present or future technologies. Further, it should be appreciated that the figures do not necessarily represent an all-inclusive representation of the embodiments herein and may have various components hidden to aid in the written description thereof.

Figure 1:
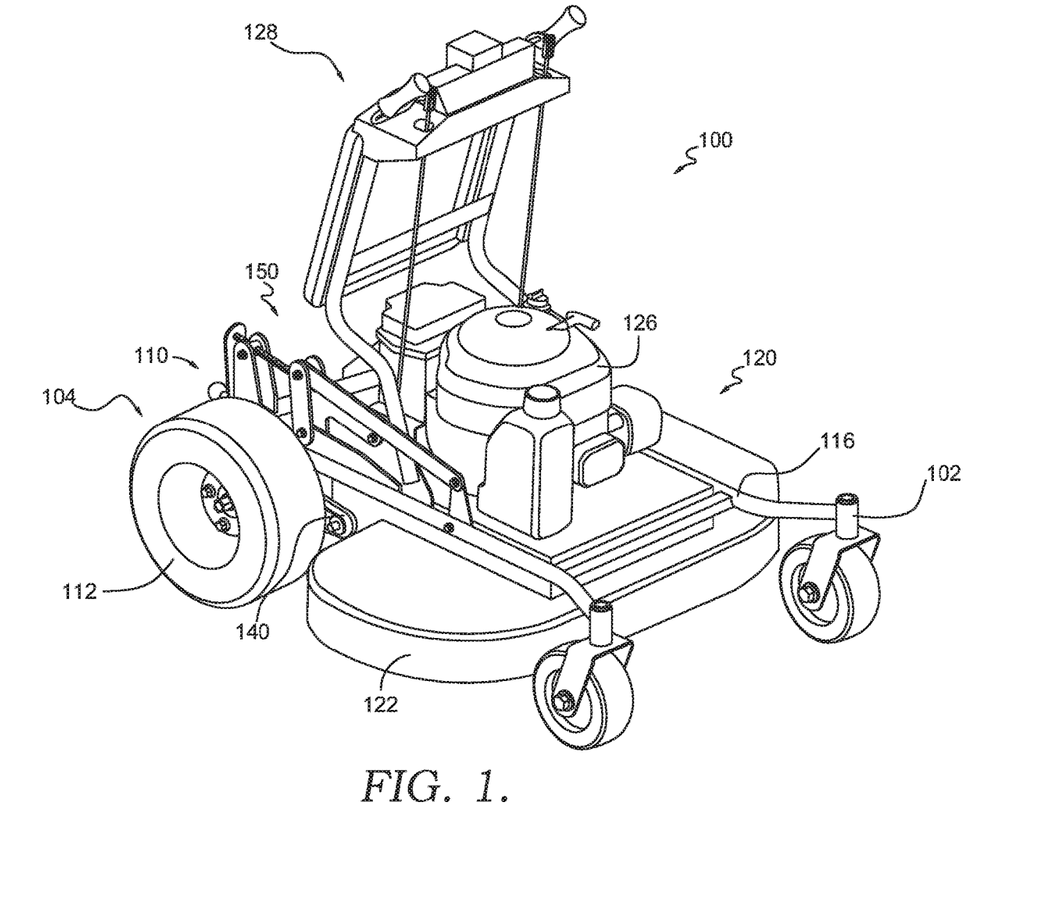
FIG. 1 depicts a perspective view of an exemplary stand-on mower having a height adjustment mechanism, a first portion, and a second portion movable relative to the first portion, in accordance with aspects hereof.

FIG. 1 depicts a first exemplary embodiment of a stand-on mower 100 having a first portion 110 and a second portion 120. The first portion 110 may include a pair of rear wheels 112, a frame 116, and an operator platform (shown in FIG. 2 as reference numeral 118). The second portion 120 may include, for example, a deck 122, a power source 126, and an operator control tower 128. The deck 122 may include blades or other cutting mechanisms for cutting vegetation, such as grass and the like. The power source 126 may be an engine, a motor (e.g., an electric motor), or any other suitable mechanism for powering the stand-on mower 100.

Further, the stand-on mower 100 may include a drive linkage 140 that is rotatably coupled with the first portion 110 and the second portion 120. The drive linkage 140 may have a fixed length, which allows the second portion 120 to rotate relative to the first portion 110 about an arc. Accordingly the second portion 120 is movable relative to the first portion 110 to adjust a cutting height of the deck 122. In some aspects, the stand-on mower 100 may also include a height adjustment mechanism 150, which may be coupled with the first portion 110 and the second portion 120 (and/or the drive linkage 140). The height adjustment mechanism 150 is generally effective to move, or control movement of, the second portion 120 relative to the first portion 110 between various cutting positions.

The stand-on mower 100 may be a zero-turn stand-on mower, such that the rear wheels 112 both propel and control the steering of the stand-on mower 100. Further, although depicted in figures as a stand-on mower, it should be appreciated that this disclosure is not limited to the exemplary embodiments shown in the figures. For example, it is contemplated that the aspects herein may be implemented with a riding mower, a sit-on mower, a self-propelled walk-behind mower, or combinations of sit-on/stand-on/walk-behind mowers, among others. However, as used herein, "operator platform" refers to a platform on which an operator stands to control operation of a stand-on mower. Further, "operator platform" does not refer to a platform that supports a seat or other structure for carrying an operator, and should not be construed as such.

Figure 2:
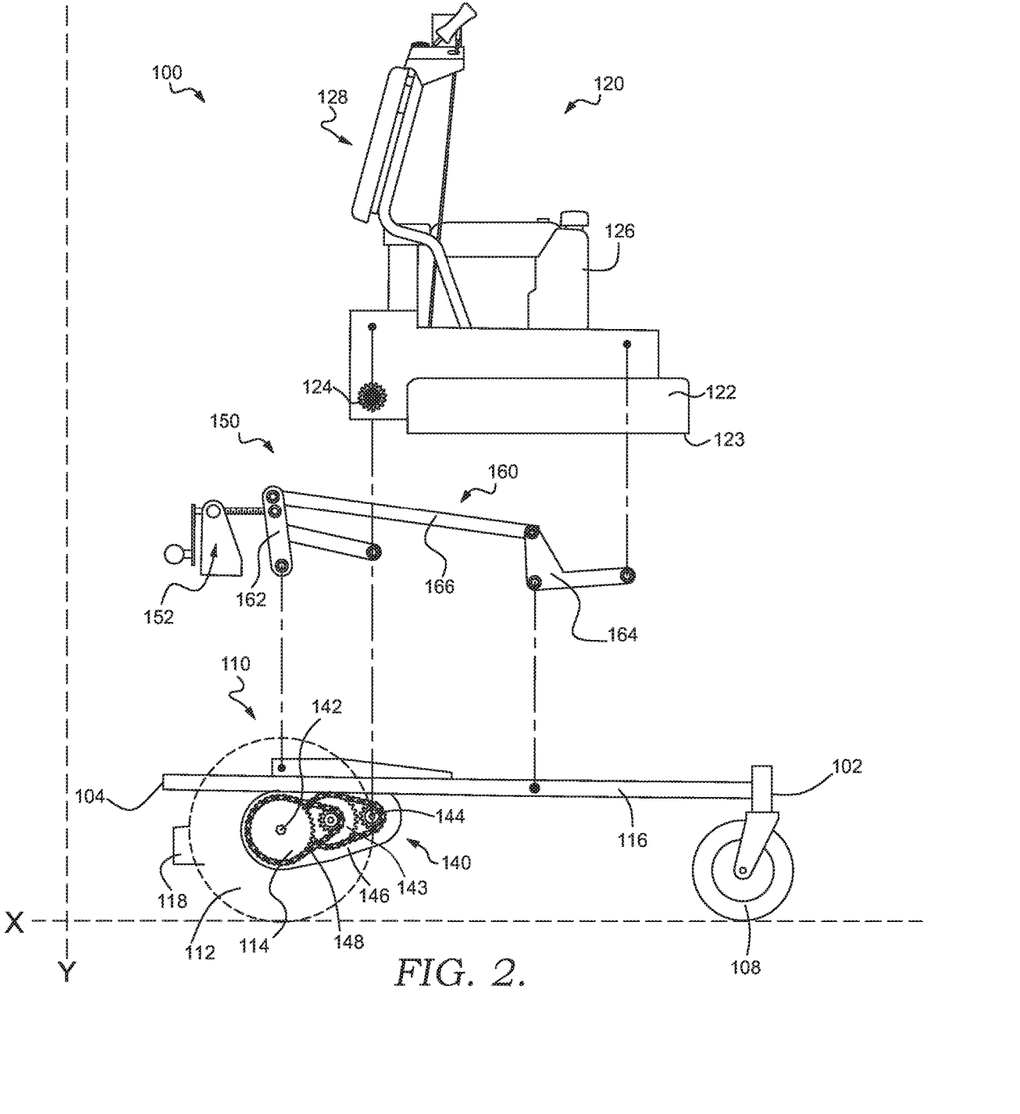
FIG. 2 depicts an exploded side view of the stand-on mower of FIG. 1, in accordance with aspects hereof.

FIG. 2 provides an exploded side view of the stand-on mower 100 of FIG. 1. In order to aid in this written description, some parts of the stand-on mower 100 have been hidden, including a rear wheel, to provide a view of parts positioned laterally behind the rear wheel. Additionally, the stand-on mower 100, as well as the other embodiments described herein, will be discussed herein with reference to a longitudinal axis X that extends between a front end 102 and a rear end 104 of the stand-on mower 100, and a vertical axis Y that is generally perpendicular to the longitudinal axis X, as depicted in FIG. 2.

Accordingly, terminology relating to relative positions of various features of the embodiments is used herein. Such terms should be interpreted according to the figures. For example, with respect to FIG. 2, if hypothetical feature A is "forward," or "forward of" hypothetical feature B, then hypothetical feature A is nearer the front end 102 of the stand-on mower 100 than hypothetical feature B. Conversely, if hypothetical feature A is "rearward of" hypothetical feature B, then hypothetical feature A is nearer the rear end 104 of the stand-on mower 100 than hypothetical feature B. Further, the term "above" refers to a feature that is further away from the longitudinal axis X, as compared to another feature. Similarly, the term "below" refers to a feature that is nearer the longitudinal axis X, as compared to another feature. Accordingly, even where the front end 102, the rear end 104, and the axes are not depicted in the figures, relative positions of features should be interpreted as described above and shown in FIG. 2, unless specifically indicated otherwise. Additionally, relative location terminology will be utilized herein. For example, the term "proximate" is intended to mean on, about, near, by, next to, at, and the like. Therefore, when a feature is proximate another feature, it is close in proximity, but not necessarily exactly at the described location, in some aspects.

As mentioned above, the stand-on mower 100 may include a first portion 110, a second portion 120, a drive linkage 140, and a height adjustment mechanism 150. In this exemplary aspect, the first portion 110 includes the rear wheels 112 and the frame 116. The first portion 110 may also include a pair of front wheels 108 coupled with the frame 116 proximate the front end 102 and an operator platform 118 that is coupled with the frame 116 proximate the rear end 104. In some aspects, the first portion 110 includes a rear-drive element 114 that is drivingly engaged with the rear wheels 112. However, the rear-drive element 114 may also be included with the drive linkage 140, as will be discussed in more detail below. The rear-drive element 114 may be a gear, a sprocket, a pulley, or other suitable mechanism for imparting rotational force to drive the rear wheels 112. In one aspect, the rear-drive element 114 may be coupled with the pair of rear wheels 112 and positioned concentric to a rear-drive element rotational axis 142. The rear-drive element rotational axis 142 may be a point around which the rear wheels 112 rotate, and may be oriented laterally and perpendicular to the longitudinal axis X.

Additionally, in the exemplary aspect shown here, the second portion 120 includes the deck 122, the power source 126, and the operator control tower 128. The operator control tower 128 generally includes operator controls, such as steering controls, operator presence controls, and/or blade controls, among others, for operating the stand-on mower 100. Although depicted here as being coupled with the second portion 120, it should be appreciated that in other aspects the operator control tower 128 may be coupled with the first portion 110. The second portion 120 may also include a powered-drive element 124 that transmits power, such as rotational force, to the rear-drive element 114. The powered-drive element 124 generally rotates about a powered-drive rotational axis 144 that is parallel to the rear-drive element rotational axis 142 (and perpendicular to the longitudinal axis X). The powered-drive element 124 may include a gear, a sprocket, a pulley, or other suitable structure, drivingly engaged (directly or via one or more additional components, as described hereinafter) with the rear-drive element 114. Additionally, the powered-drive element 124 may be an output shaft of a transmission, such as a hydrostatic transmission, a continuously-variable transmission, or any other suitable mechanism for providing power to the rear-drive element 114. In some aspects, the power source 126 may supply power to the powered-drive element 124. The powered-drive element 124 may be drivingly coupled with the rear-drive element 114, directly or indirectly, using any suitable mechanism or structure.

For example, a drive linkage 140 may couple the powered-drive element 124 and the rear-drive element 114. The drive linkage 140 may include a drive-link 146 that is rotatably coupled with the first portion 110 about the rear-drive element rotational axis 142 and the second portion 120 about the powered-drive rotational axis 144. The drive-link 146 may be static, or substantially static, such that the drive-link 146 maintain a fixed distance (designated in FIGS. 3-5 by reference numeral 240A) between the first portion 110 and the second portion 120. Additionally, the drive linkage 140 may include one or more power transfer devices 148 that couple the powered-drive element 124 with the rear-drive element 114. The drive linkage 140 may also include one or more intermediate-drive elements 143. The intermediate-drive elements 143 may include reduction gears/sprockets, or other mechanism for modifying gear ratios (and vehicle speed). In some aspects, the power transfer devices 148 may include a belt, chain, or other mechanism. For example, as shown in FIG. 4, the power transfer devices 148 may be drive chains coupled with the powered-drive element 124, the intermediate-drive element 143, and the rear-drive element 114. However, any suitable mechanism for transferring power between the powered-drive element 124 and the rear-drive element 114 is considered within the scope of this disclosure.

The exemplary aspect depicted here also includes a height adjustment mechanism 150, which may include a height adjustment control 152, and a height adjustment linkage 160. The height adjustment control 152 may comprise a lever, a button, a selector, an actuator, or other suitable means for controlling height adjustment. For example, in the embodiment depicted in FIG. 2, the height adjustment control 152 comprises a hand crank. However, it should be appreciated that the height adjustment control 152 may comprise any suitable mechanism for moving (or controlling movement of) the second portion 120 between positions. For example, an electric motor may provide power to move the second portion 120 relative to the first portion 110, and, in some aspects, power from the power source 126 (via the powered-drive element 124) may provide a rotational force for moving the second portion 120.

Additionally, in this exemplary aspect, the height adjustment control 152 may be coupled with the height adjustment linkage 160. The height adjustment linkage 160 may be coupled with the first portion 110 and the second portion 120 (and/or the drive linkage 140). In the exemplary embodiment shown in FIG. 2, the height adjustment linkage 160 includes a first height adjustment link 162, a second height adjustment link 164, and a connecting arm 166. In some aspects, the height adjustment linkage 160 and the drive linkage 140 form a parallel linkage that facilitates movement of the second portion 120 relative to the first portion 110, as will be discussed in more detail below with reference to FIG. 5. Accordingly, the height adjustment linkage 160 may transmit a force supplied by the height adjustment control 152 to the second portion 120, thereby causing rotation of the second portion 120 and a change in the cutting height of the deck 122.

Figure 3:
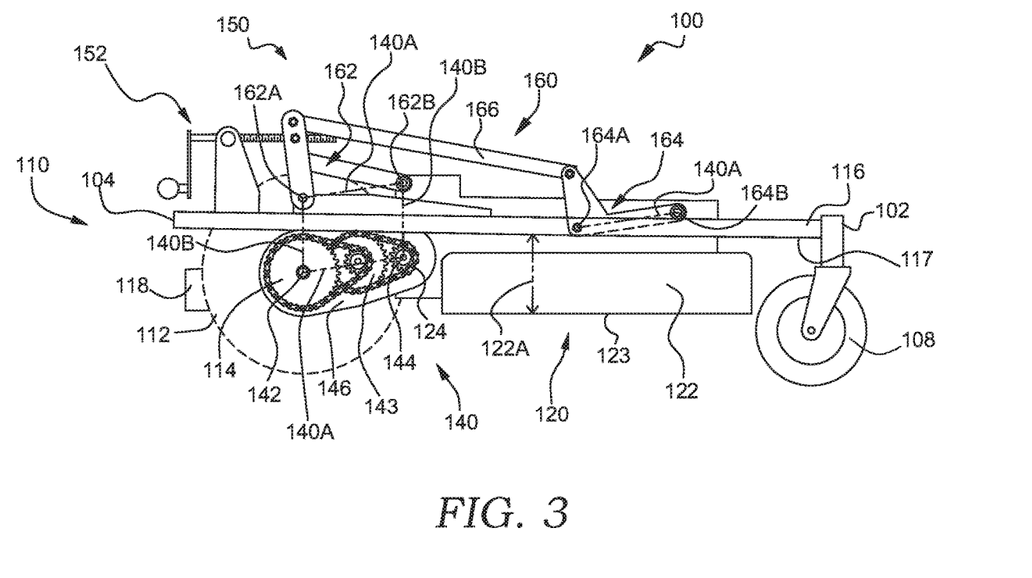
FIG. 3 depicts a side view of the stand-on mower of FIG. 2 in a first position, with some parts hidden for clarity, having a first portion and a second portion movable relative to the first portion, in accordance with aspects hereof.
Figure 4:
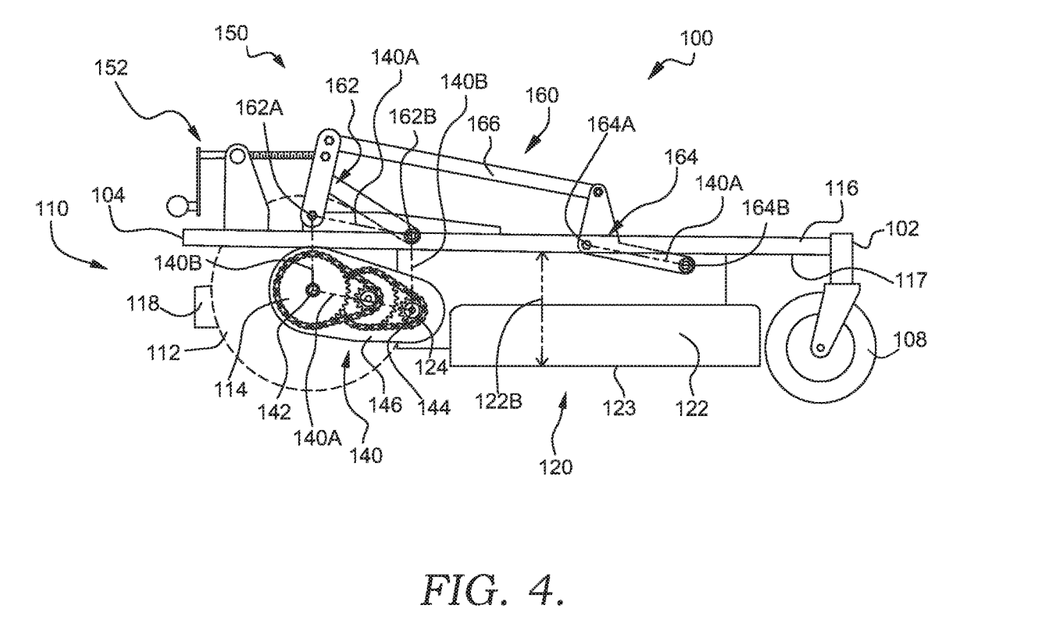
FIG. 4 depicts a side view of the stand-on mower of FIG. 3 in a second position, in accordance with aspects hereof.

FIG. 3 depicts a side view of stand-on mower 100 depicted in FIG. 2, in a first position, with some parts hidden for clarity. In the first position, a second portion bottom edge 123 is spaced apart from a frame bottom edge 117 of the frame 116 by a first cutting height distance 122A. In this exemplary embodiment, the first portion 110 includes the rear wheels 112, the frame 116, the front wheels 108, and the operator platform 118. Further, the first portion 110 may include, or be coupled with, the rear-drive element 114, which rotates about the rear-drive element rotational axis 142. Additionally, in this embodiment, the second portion 120 includes the deck 122 and the power source 126 (hidden for clarity). The second portion 120 may also include, or be coupled with, the powered-drive element 124, which rotates about the powered-drive rotational axis 144.

The drive linkage 140 is rotatably coupled with the first portion 110 about the rear-drive element rotational axis 142 and coupled with the second portion 120 about the powered-drive element rotational axis 144. The rear-drive element rotational axis 142 and the powered-drive rotational axis 144 are spaced apart by a first distance 140A. The drive linkage 140 maintains the first distance 140A between the powered-drive element rotational axis 144 and the rear-drive element rotational axis 142. As a result, the second portion 120 is rotatable relative to the first portion 110 about an arc (depicted in FIG. 5 and designated by reference numeral 141) having an origin at the rear-drive element rotational axis 142 and a radius equal to the first distance 140A, as will be described in more detail below.

The exemplary height adjustment mechanism 150 depicted here includes the height adjustment linkage 160. The height adjustment linkage 160 may include a first height adjustment link 162 coupled with the first portion 110 at a first height adjustment link first pivot joint 162A and rotatably coupled with the second portion 120 at a first height adjustment link second pivot joint 162B. Additionally, the first height adjustment link first pivot joint 162A and the first height adjustment link second pivot joint 162B may be spaced apart by the first distance 140A. The first height adjustment link 162 may be coupled with the first portion 110, for example, proximate the frame 116 at a position vertically above and spaced apart from the rear-drive element rotational axis 142 by a second distance 140B. The first height adjustment link 162 may also be coupled with the second portion 120 proximate a rear end of the second portion 120 at a position vertically above, and spaced apart from, the powered-drive element rotational axis 144 by the second distance 140B.

Said another way, the first height adjustment link 162 and drive linkage 140 (including the drive-link 146) form a closed kinematic chain. That is, the first height adjustment link first pivot joint 162A and rear-drive element rotational axis 142 have fixed positions relative one another with respect to first portion 110. Because vertical movement of first portion 110 (and the rear-drive element rotational axis 142) is limited by contact with the ground, the first height adjustment link first pivot joint 162A and the rear-drive element rotational axis 142 may function as fixed pivots. Further, first height adjustment link second pivot joint 162B and the powered-drive rotational axis 144 have fixed positions relative one another with respect to the second portion 120. However, because the second portion 120 (and the powered-drive element rotational axis 144) is not generally limited by contact with the ground, the first height adjustment link second pivot joint 162B and powered-drive rotational axis 144 may function as moving pivots. Accordingly, as the first height adjustment link 162 is moved, the drive linkage 140 may move in parallel to the first height adjustment link 162.

The height adjustment linkage 160 may also include a second height adjustment link 164 rotatably coupled with the first portion 110 at a second height adjustment link first pivot joint 164A and rotatably coupled with the second portion 120 at a second height adjustment link second pivot joint 164B. The second height adjustment link first pivot joint 164A and the second height adjustment link second pivot joint 164B may also be spaced apart by the first distance 140A. In some aspects, the second height adjustment link first pivot joint 164A is positioned forward of the first height adjustment link second pivot joint 162B and the second height adjustment link second pivot joint 164B is positioned proximate a front end of the second portion 120. Additionally, the height adjustment linkage 160 may include a connecting arm 166 connecting the first height adjustment link 162 with the second height adjustment link 164.

The height adjustment control 152 may be drivingly coupled with the height adjustment linkage 160 and may be coupled with one or more of the frame 116 and the drive linkage 140. In the exemplary embodiment depicted in FIG. 3, the height adjustment control 152 is a hand crank anchored to the frame 116 and adjustably coupled with the first height adjustment link 162. However, it should be appreciated that the height adjustment control 152 may be coupled with the height adjustment linkage 160 and/or the drive linkage 140 at any number of suitable locations. Accordingly, the height adjustment control 152 may provide a force that causes the first height adjustment link 162 to pivot about the first height adjustment link first pivot joint 162A. As a result, the first height adjustment link second pivot joint 162B is moved along an arc having an origin at first height adjustment link first pivot joint 162A and a radius equal to 140A. Further, because first height adjustment link second pivot joint 162B and powered-drive rotational axis 144 have fixed positions relative to one another on the second portion 120, movement of the first height adjustment link second pivot joint 162B along the arc causes movement of the powered-drive rotational axis 144 along the arc (depicted in FIG. 5 by reference numeral 141) having the origin at rear-drive element rotational axis 142. Additionally, when the height adjustment control 152 causes (or allows) movement of the first height adjustment link 162, the connecting arm 166 transmits a corresponding movement to the second height adjustment link 164. As a result, the second height adjustment link second pivot joint 164B is moved along an arc having an origin at the second height adjustment link first pivot joint 164A and a radius of 140A. Accordingly, the deck 122 may remain substantially parallel to the longitudinal axis X as the cutting height is adjusted.

It should be appreciated that the height adjustment mechanisms depicted in the figures are exemplary only, and any suitable mechanism for adjusting or selecting a cutting height of the deck 122 is considered within the scope of this disclosure. Further, it should be appreciated that the height adjustment linkage 160 may include a single height adjustment link, several height adjustment links, or other suitable variations of the aspects depicted in the figures.

Turning now to FIG. 4, the stand-on mower 100 according to FIG. 3 is shown in a second position. The second portion 120 (including the deck 122) has been lowered in FIG. 4, as compared to the first position shown in FIG. 3. As a result, the second portion bottom edge 123 is spaced apart from the frame bottom edge 117 by a second cutting height distance 122B (which is greater than 122A). In order to move the second portion 120 to the second position, the height adjustment control 152 has applied a force to the height adjustment linkage 160, thereby causing the second portion 120 to move vertically away from the frame bottom edge 117 (due to the rotation of the first height adjustment link 162, the second height adjustment link 164, and the drive linkage 140, as described above). Although the second portion 120 has moved compared to the position shown in FIG. 3, the powered-drive element rotational axis 144 and the rear-drive element rotational axis 142, and the first height adjustment link first pivot joint 162A and the first height adjustment link second pivot joint 162B, remain spaced apart by the first distance 140A.

Figure 5:
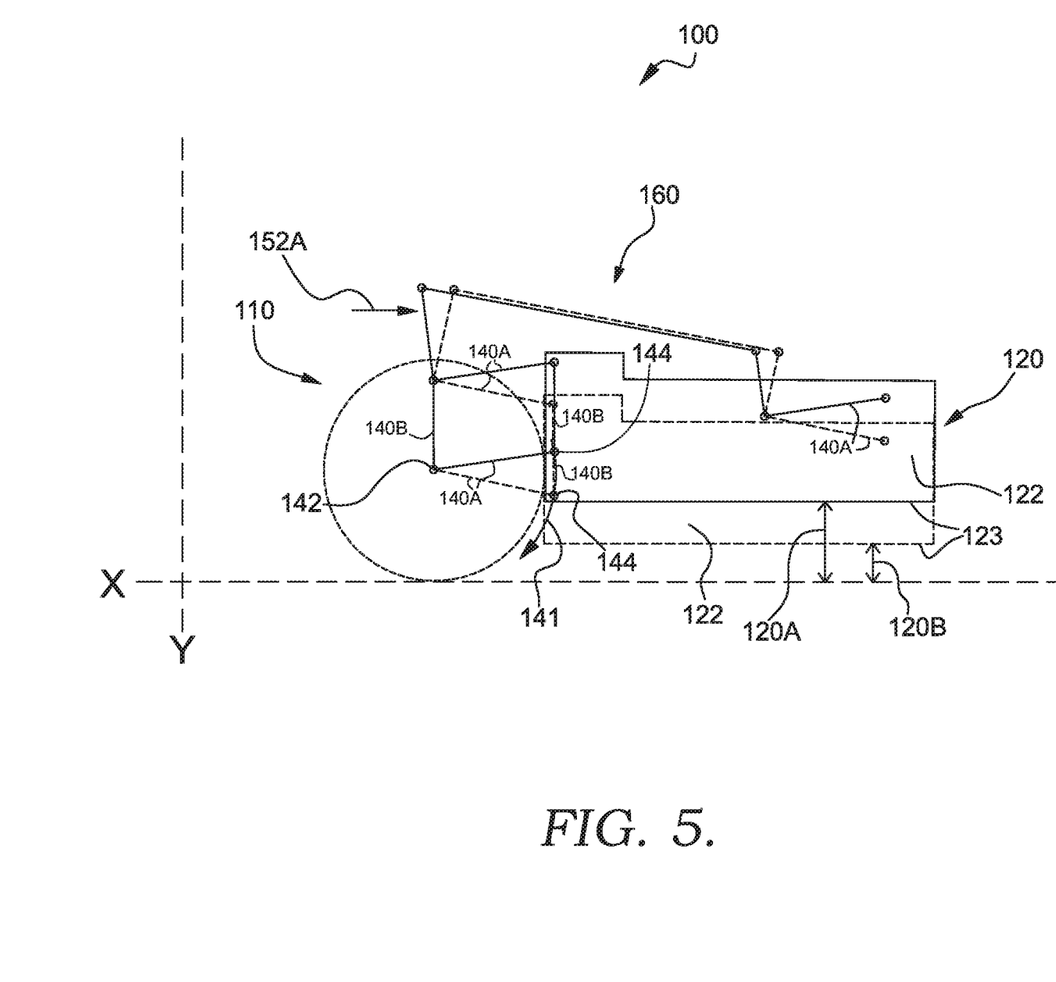
FIG. 5 depicts a simplified side view of the stand-on mower of FIGS. 3 and 4, in accordance with aspects hereof.

FIG. 5 provides a simplified diagrammatic view of the stand-on mower 100 according to FIGS. 3 and 4, to illustrate the movement of the second portion 120 between the first position and the second position (shown in dashed line). As discussed hereinabove, the rear-drive element rotational axis 142 is positioned at a fixed point on the first portion 110 and the powered-drive rotational axis 144 is positioned at a fixed point on the second portion 120. However, the powered-drive rotational axis 144 is movable relative to the rear-drive element rotational axis 142. In the first position, the rear-drive element rotational axis 142 is spaced apart from the powered-drive rotational axis 144 by the first distance 140A. Additionally, in the first position, the second portion 120 is spaced apart from the longitudinal axis X by a first cutting height distance 120A.

The second portion 120 may be moved from the first position toward the second position, for example, by a force (indicated by arrow 152A), which may be supplied by the height adjustment control 152. As the second portion 120 moves between the first position and the second position, the powered-drive rotational axis 144 travels about the arc 141 having the origin at the rear-drive element rotational axis 142 and the radius equal to the first distance 140A, to the point shown in the second position. As can be appreciated, the first distance 140A between the rear-drive element rotational axis 142 and the powered-drive rotational axis 144 remains constant as the powered-drive rotational axis 144 swings through the arc 141. Accordingly, the first distance 140A between the rear-drive element rotational axis 142 and the powered-drive rotational axis 144 remains the same in the second position. However, in the second position, the second portion 120 is spaced apart from the longitudinal axis X by a second cutting height distance 120B, which is less than the first cutting height distance 120A.

Figure 6:
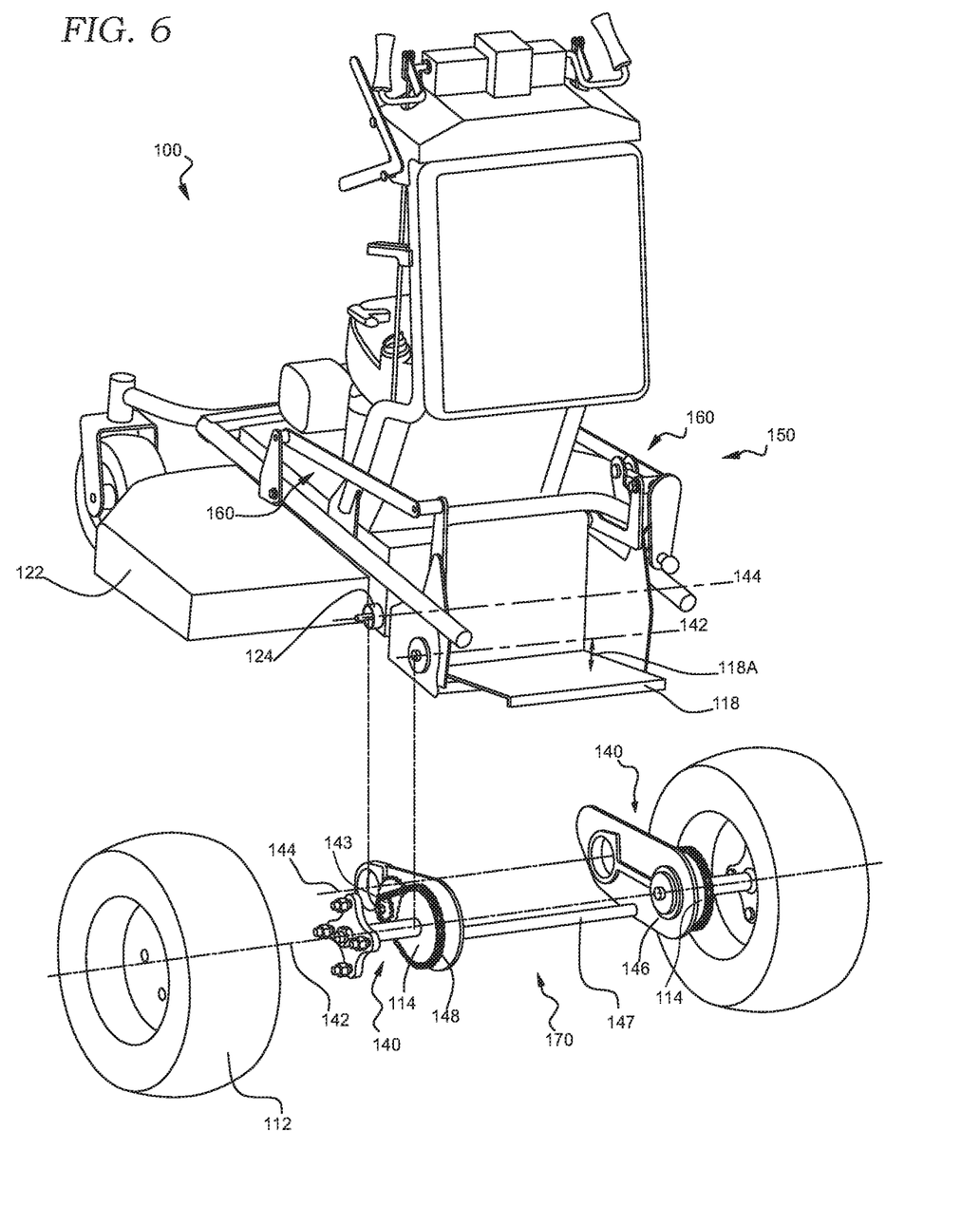
FIG. 6 depicts a rear-perspective, partially-exploded view of additional aspects, in accordance with aspects hereof.

FIG. 6 depicts a rear-perspective, partially-exploded view of additional aspects of the stand-on mower 100. It should be appreciated that although various aspects herein may be described and shown in some figures as a single component (for example, the drive linkage 140, rear-drive element 114, powered-drive element 124, and height adjustment linkage 160), the stand-on mower 100 may include similar components at an opposite side of the stand-on mower 100. Such components may be substantially mirror-images of one another, such that a description of one of the components may equally apply to the other component. For ease of readability, in some instances, only one of the components may be described. For example, the rear-drive elements 114 depicted here in FIG. 6 may be substantially similar, with a description of one being equally applicable to the other. Similarly, the height adjustment linkage 160 may comprise two separate linkages at opposite sides of the stand on mower 100.

Additionally, in some aspects, the stand-on mower 100 may include two drive linkages 140, which may be connected by a drive-unit rod 147 to form a drive unit 170. In this aspect, the rear-drive elements 114, intermediate-drive elements 143, the power transfer devices 148, and, in some cases, the powered-drive elements 124 may be rotatably coupled with the drive links 146. Accordingly, each of the above-noted components may be packaged as a single drive unit 170 that may be coupled with the first portion 110 at the rear-drive element rotational axis 142 and the powered-drive element rotational axis 144.

As mentioned above, one or more intermediate-drive elements 143 may be interposed between the rear-drive element 114 and the powered-drive element 124. For example, the intermediate-drive element 143 may comprise a reduction gear set or a combination gear to provide a gear reduction between the rear-drive element 114 and the powered-drive element 124.

Additionally, as shown here, the operator platform 118 may be positioned such that at least a portion of the operator platform 118 is below the rear-drive element rotational axis 142, as indicated by arrow 118A. In some traditional stand-on mowers, the operator platform is positioned above a rotational axis of the drive wheels, which increases the overall height of such mowers and decreases clearance (e.g., for overhead obstacles). Additionally, positioning the operator platform 118 below (and behind, in some aspects) the rear-drive element rotational axis 142 may improve weight distribution as compared to traditional stand-on mowers.

Figure 7:
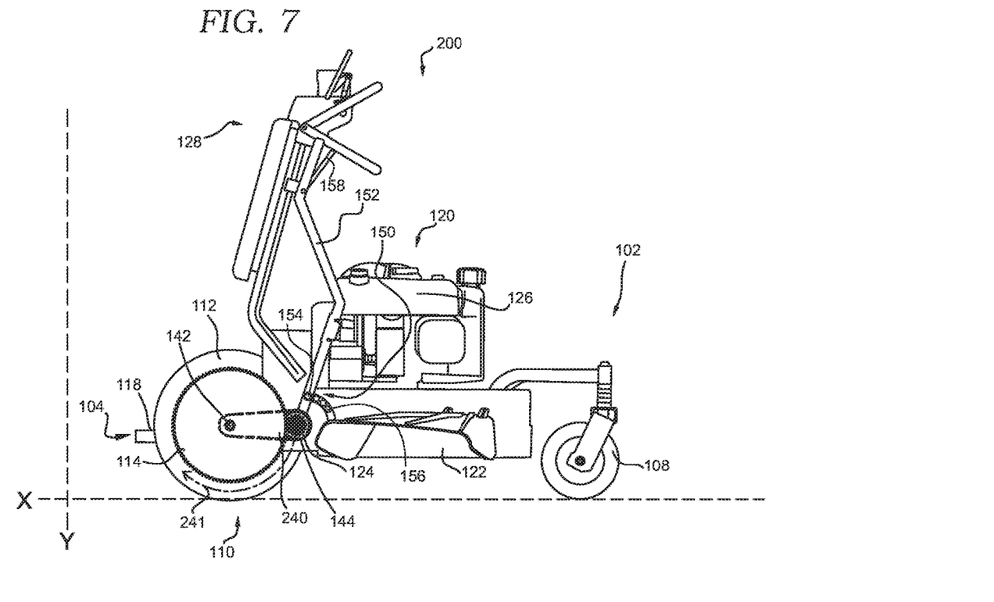
FIG. 7 depicts a side view of another exemplary stand-on mower in a first position, with some parts hidden for clarity, having a first portion and a second portion movable relative to the first portion, in accordance with aspects hereof.

FIG. 7 depicts another exemplary embodiment of a stand-on mower 200, in a first position. In order to aid in this written description, some parts of the stand-on mower 200 have been hidden, including a rear wheel, to provide a view of parts positioned laterally behind the rear wheel. The stand-on mower 200 has a longitudinal axis X that extends between a front end 102 and a rear end 104 of the mower. The stand-on mower 200 also includes a first portion 110 and a second portion 120. Except where specifically indicated, the components of this embodiment should be considered similar to those previously described, and, as such, the description thereof will not be repeated in full here.

In the exemplary aspect shown here, the first portion 110 includes the pair of rear wheels 112 and the rear-drive element 114 that is drivingly engaged with the rear wheels 112. In one aspect, the rear-drive element 114 may be coupled with the pair of rear wheels 112 and positioned concentric to a rear-drive element rotational axis 142. The rear-drive element rotational axis 142 may be a point around which the rear wheels 112 rotate, and may be oriented laterally and perpendicular to the longitudinal axis X. In this embodiment, the rear-drive element 114 comprises a gear. However, the rear-drive element 114 depicted in the figures is exemplary only, and, as discussed hereinabove, may be a sprocket, a pulley, or other suitable mechanism for imparting rotational force to drive the rear wheels 112.

Additionally, in the exemplary aspect shown here, the second portion 120 includes the deck 122, the power source 126, and the operator control tower 128. Although depicted here as being coupled with the second portion 120, it should be appreciated that in other aspects the operator control tower 128 may be coupled with the first portion 110. The second portion 120 may also include the powered-drive element 124 that transmits power, such as rotational force, to the rear-drive element 114. The powered-drive element 124 generally rotates about the powered-drive rotational axis 144 that is parallel to the rear-drive element rotational axis 142 (and perpendicular to the longitudinal axis X). The powered-drive element 124 is depicted here as a gear drivingly engaged with the rear-drive element 114. However, it should be appreciated, that the powered-drive element 124 may be a sprocket, a pulley, an output shaft of a transmission, such as a hydrostatic transmission, a continuously-variable transmission, or any other suitable mechanism for transferring power to the rear-drive element 114. In some aspects, the power source 126 may supply power to the powered-drive element 124. The powered-drive element 124 may be drivingly coupled with the rear-drive element 114, directly or indirectly, using any suitable mechanism or structure.

For example, one or more intermediate-drive elements (such as those shown in FIGS. 2-4 and 6) may be interposed between and drivingly coupled with the rear-drive element 114 and the powered-drive element 124. In some aspects, the intermediate-drive elements may include one or more gears interposed between the rear-drive element 114 and the powered-drive element 124 to provide a gear reduction therebetween. In other aspects, the powered-drive element 124 and the rear-drive element 114 may be drivingly coupled via a belt, a chain, or other suitable mechanism (such as those shown in FIGS. 2-4 and 6). However, any suitable mechanism for transferring power between the powered-drive element 124 and the rear-drive element 114 is considered within the scope of this disclosure.

The stand-on mower 200 may include a drive linkage 240 that is rotatably coupled with the first portion 110 about the rear-drive element rotational axis 142 and the second portion 120 about the powered-drive rotational axis 144. The drive linkage 240 may be static, or substantially static, such that the drive linkage 240 maintains a fixed distance between the first portion 110 and the second portion 120. Additionally, the drive linkage 140 may include one or more power transfer devices that couple the powered-drive element 124 with the rear-drive element 114.

FIG. 7 also depicts another embodiment of the height adjustment mechanism 150 including the height adjustment control 152. In some aspects, the height adjustment control 152 may comprise a lever, a button, a selector, or other suitable mechanism for controlling height adjustment. For example, in the embodiment depicted in FIG. 7, the height adjustment control 152 comprises a lever. In this example, the height adjustment control 152 may be affixed to the drive linkage 240 and may secure the drive linkage 240 at a plurality of positions relative to the second portion 120.

Further, the height adjustment control 152 may include a keeper pin 154 that mates with one or more apertures 156. The height adjustment control 152 may also include a trigger 158 that retracts the keeper pin 154 from the apertures 156 to allow for adjustment of the cutting height. The apertures 156 may be oriented at a variety of angles corresponding to different cutting heights. It should be appreciated that the height adjustment control 152 depicted in the figures is exemplary only, and any suitable mechanism for adjusting or selecting a height is considered within the scope of this disclosure.

The stand-on mower 200 may also include a pair of front wheels 108, which, in one aspect, may be coupled to the second portion 120. The front wheels 108 may be rotatable 360° and, in one example, may be caster wheels. A height of the front wheels 108 may be adjustable, using any suitable mechanism, such that the front wheels 108 may be adjusted to maintain the deck 122 in a substantially level position. For example, one or more spacers may be added and removed to adjust the height of the front wheels 108.

Figure 8:
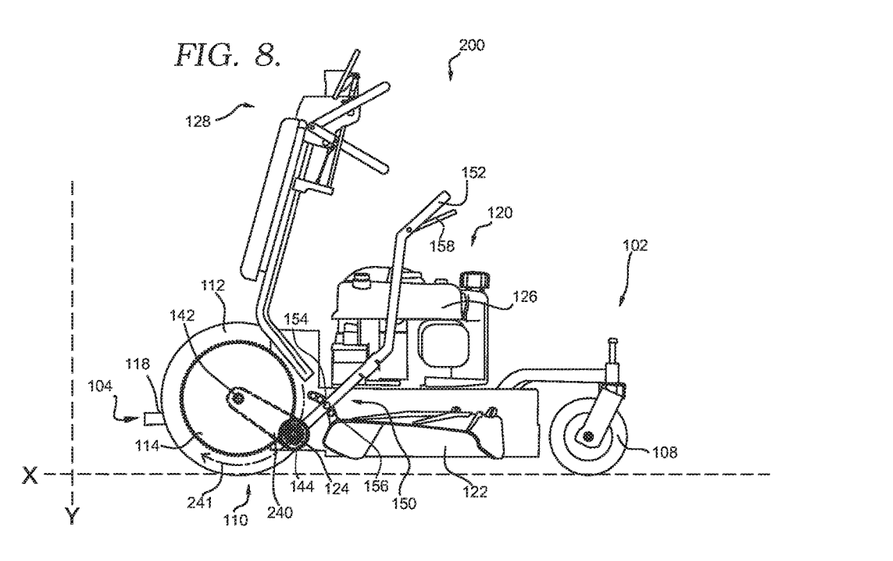
FIG. 8 depicts a side view of the stand-on mower of FIG. 7 in a second position, in accordance with aspects hereof.

Turning now to FIG. 8, the stand-on mower 200 of FIG. 7 is depicted in a second position. In the second position, the second portion 120 has been lowered (and as a result, the cutting height has also been lowered), as compared to the first position depicted in FIG. 7. The powered-drive element 124 has rotated about the perimeter of the rear-drive element 114 along an arc 241 having an origin at the rear-drive element rotational axis 142, such that the second portion 120 has moved toward the longitudinal axis X and the vertical axis Y. Additionally, the height adjustment control 152 has rotated with the drive linkage 240 to secure the second portion 120 in the second position.

Accordingly, the second portion 120 is movable relative to the first portion 110 about the arc 241. In some aspects, rotation of the powered-drive element 124 may provide a force to move the second portion 120 relative to the first portion 110. For example, when the position of the drive linkage 240 is not fixed relative to the second portion 120 (e.g., by the height adjustment mechanism 150), the powered-drive element 124 may move the second portion 120 from the position shown in FIG. 7 to the position shown in FIG. 8. As depicted in FIG. 7 and FIG. 8, the powered-drive element 124 has rotated in a clockwise direction around the perimeter of the rear-drive element 114, which remains stationary due to ground contact or limiting rotation via brakes or other mechanism. However, when the position of the drive linkage 240 is fixed, for example, by the height adjustment mechanism 150, the second portion 120 is retained in a fixed position along the arc 241. As a result, when the position of the drive linkage 240 is fixed, the rotation of the powered-drive element 124 causes the rear-drive element 114 to rotate, thereby driving the rear wheels 112. While using power from the power source 126 to move the second portion 120 relative to the first portion 110 is described herein, it should be appreciated that the force for moving the second portion 120 relative to the first portion 110 may be accomplished via any suitable means. For example, the height adjustment control 152 (in this case a lever) may provide the force for moving the second portion 120 relative to the first portion 110.

Figure 9:
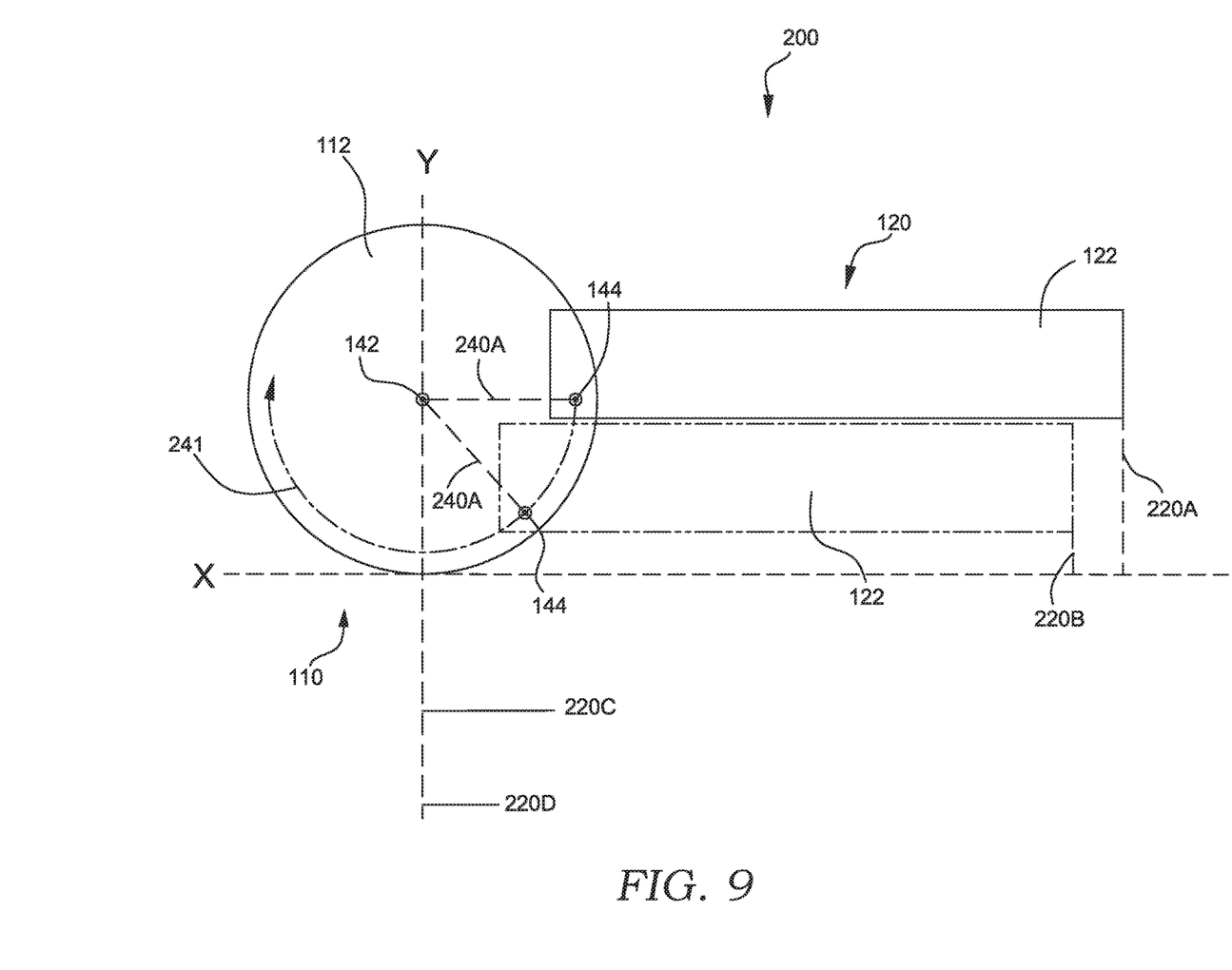
FIG. 9 depicts a simplified side view of the stand-on mower of FIGS. 8 and 9, in accordance with aspects hereof.

FIG. 9 provides a simplified side view of the mower 200 according to FIGS. 7 and 8, to illustrate the movement of the mower 200 between the first position and the second position (shown in dashed line). As discussed hereinabove, the rear-drive element rotational axis 142 is positioned at a fixed point on the first portion 110. The powered-drive rotational axis 144 is positioned at a fixed point on the second portion 120, however, the powered-drive rotational axis 144 is movable relative to the rear-drive element rotational axis 142. In the first position, the rear-drive element rotational axis 142 is spaced apart from the powered-drive rotational axis 144 by a distance, indicated here as 240A. Additionally, in the first position, the second portion 120 is spaced apart from the longitudinal axis X by a distance, as indicated 220A. Further, in the first position, the second portion 120 is spaced apart from a vertical axis Y, as shown by 220C, which indicates a distance between the second portion 120 and the vertical axis Y.

As the second portion 120 moves between the first position and the second position, the powered-drive rotational axis 144 travels about the arc 241. Similar to the embodiments described hereinabove, the distance 240A between the rear-drive element rotational axis 142 and the powered-drive rotational axis 144 remains constant as the powered-drive rotational axis 144 swings through the arc 241. Accordingly, the distance 240A between the rear-drive element rotational axis 142 and the powered-drive rotational axis 144 remains the same in the second position. However, in the second position, the distances (represented by 220B and 220D, respectively) between the second portion 120, the longitudinal axis X, and the vertical axis Y, have decreased as compared to the first position. Accordingly, 220A>220B and 220C>220D, in that the distances between the second portion 120 and the longitudinal axis X and the vertical axis Y in the first position is greater than a distance between the second portion 120 and the longitudinal axis X and the vertical axis Y in the second position.

Figure 10:
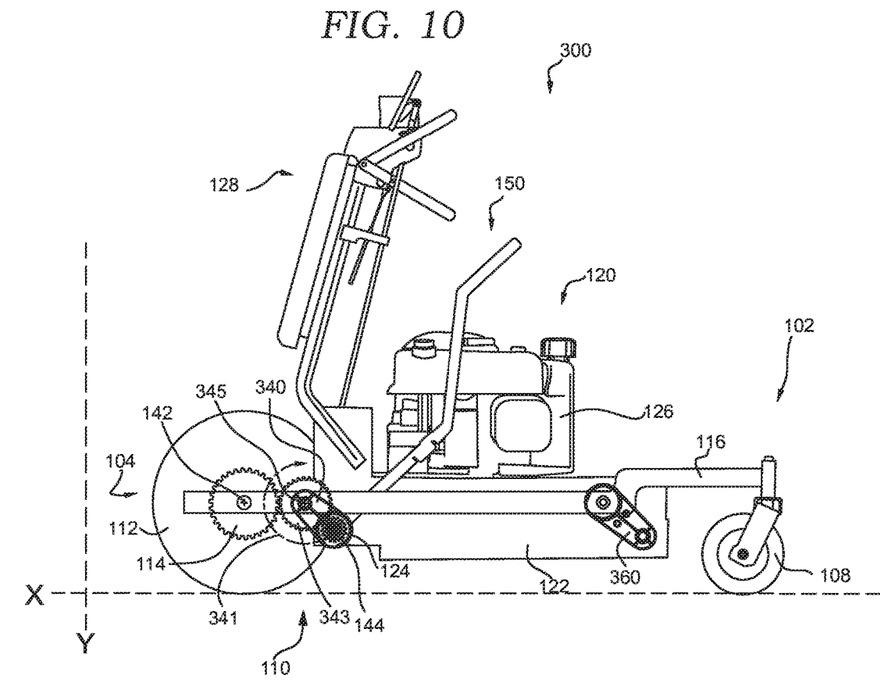
FIG. 10 depicts a side view of another exemplary stand-on mower, in accordance with aspects hereof.

FIG. 10 depicts an alternative exemplary embodiment of a stand-on mower 300. Except where specifically indicated, the components of this embodiment should be considered similar to those previously described. The stand-on mower 300 has a first portion 110 that includes the rear wheels 112 and the frame 116. In one aspect, the first portion 110 also includes a rear-drive element 114 and an intermediate-drive element 343, each of which may be rotatably coupled with the first portion 110 (e.g., proximate the frame 116). Similar to the embodiments described hereinabove, the rear-drive element 114 includes a rear-drive element rotational axis 142. The intermediate-drive element 343 may include an intermediate-drive rotational axis 345 that is parallel to the rear-drive element rotational axis 142 (and perpendicular to the longitudinal axis X).

The stand-on mower 300 may also include a second portion 120 comprising the deck 122 and the power source 126. As described hereinabove, the second portion 120 may include the powered-drive element 124 having a powered-drive element rotational axis 144. The intermediate-drive element 343 may be interposed between and drivingly coupled with the rear-drive element 114 and the powered-drive element 124 via any suitable mechanism, as described hereinabove.

In this embodiment, the stand-on mower 300 includes a rear link 340 that is rotatably coupled with the first portion 110 about the intermediate-drive element rotational axis 345 and the second portion 120 about the powered-drive element rotational axis 144. The rear link 340 (and the intermediate drive element 343) may be coupled with the first portion 110 at a position rearward of, and vertically above, the powered-drive element rotational axis 144. Similar to the drive link in the embodiments described hereinabove, the rear link 340 may have a fixed length. Accordingly, the second portion 120 may be movable relative to the first portion 110 through an arc 341 having an origin at an intermediate-drive rotational axis 345. In additional aspects, one or more intermediate-drive elements may be positioned on the second portion 120, adjacent to the powered-drive element 124.

Further, the stand-on mower 300 may include a front link 360 rotatably coupled with the first portion 110 and the second portion 120. The front link 360 may be coupled with the first portion 110 (e.g. at the frame 116) at a position forward of the rear link 340, for example, at a point approximately longitudinally aligned with a front end of the power source 126. The front link 360 may be coupled with the second portion 120 at a position proximate a front end of the mowing deck 122, or other position suitable to support a portion of the weight of the second portion 120. Accordingly, the second portion 120 may be partially suspended from the first portion 110 by the rear link 340 and the front link 360. Further, the front link 360 may have the same length as the rear link 340. Resultantly, as the powered-drive element 124 rotates about the arc 341 and moves the second portion 120, the front link 360 rotates in parallel with the rear link 340. Accordingly, the second portion 120 remains substantially parallel to the longitudinal axis X as the cutting height is adjusted.

Figure 11:
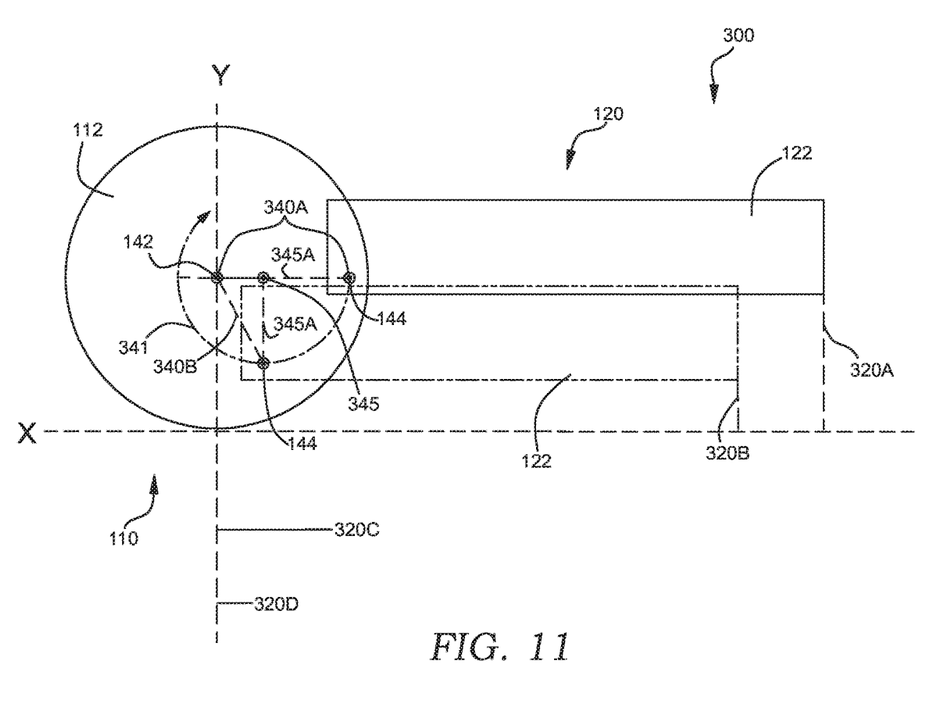
FIG. 11 depicts a simplified side view of the stand-on mower of FIG. 10, in accordance with aspects hereof.

FIG. 11 illustrates a simplified version of the stand-on mower 300 shown in FIG. 10 in a first position and a second position (shown in dashed line). In this embodiment, the distance 345A between the intermediate-drive rotational axis 345 and the powered-drive rotational axis 144 is fixed (due to fixed length of the rear link 340, as shown in FIG. 10). Additionally, in the first position, the second portion 120 is spaced apart from the longitudinal axis X by a distance, as indicated 320A. Further, in the first position, the second portion 120 is spaced apart from a vertical axis Y, as shown by 320C, which indicates a distance between the second portion 120 and the vertical axis Y.

However, in the second position, the distances (represented by 320B and 320D, respectively) between the second portion 120, the longitudinal axis X, and the vertical axis Y, have decreased as compared to the first position. Accordingly, 220A>220B and 220C>220D, in that the distances between the second portion 120 and the longitudinal axis X and the vertical axis Y in the first position is greater than a distance between the second portion 120 and the longitudinal axis X and the vertical axis Y in the second position. Further, in this embodiment, the distance between the rear-drive element rotational axis 142 and the powered-drive element rotational axis 144 is decreased and the second position, as indicated by 340B. Accordingly, as the powered-drive rotational axis 144 rotates about the arc 341 to the second position, the distance 345A between the intermediate-drive rotational axis 345 and the powered-drive rotational axis 144 remains constant.

Turning now to a general discussion of each of the embodiments described hereinabove, a variety of features discussed with respect to specific embodiments may be implemented with any of the embodiments described herein. Additionally, some of the features described hereinabove may include variations, which may be applicable to each of the embodiments described herein. For example, although the embodiments described hereinabove and depicted in the figures may provide advantageous configurations, other configurations should be considered within the scope of this disclosure.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims.

What is claimed:

1. A stand-on mower comprising:
a first portion comprising a pair of rear wheels and a rear-drive element, the rear-drive element having a rear-drive element rotational axis;
a second portion comprising a mowing deck, a power source coupled with the mowing deck, and a powered-drive element, the powered-drive element having a powered-drive element rotational axis;
a drive linkage rotatably coupled with the first portion about the rear-drive element rotational axis and coupled with the second portion about the powered-drive element rotational axis, wherein the drive linkage maintains a first distance between the powered-drive element rotational axis and the rear-drive element rotational axis; and
an operator platform coupled with one of the first portion and the second portion,
wherein the second portion is movable relative to the first portion in an arc having an origin at the rear-drive element rotational axis between a first position and a second position,
wherein the stand-on mower comprises a zero-turn stand-on mower.

2. The stand-on mower of claim 1 further comprising a frame, wherein a second portion bottom edge is spaced apart from the frame by a first cutting height distance in the first position and the second portion bottom edge is spaced apart from the frame by a second cutting height distance in the second position.

3. The stand-on mower of claim 2, wherein the rear wheel rotational axis is spaced apart from the powered-drive element rotational axis by the first distance in each of the first position and the second position.

4. The stand-on mower of claim 3, further comprising a height adjustment mechanism including a height adjustment linkage having at least one height adjustment link rotatably coupled with the first portion at a first pivot joint and rotatably coupled with the second portion at a second pivot joint.

5. The stand-on mower of claim 4, wherein the first pivot joint and the second pivot joint are spaced apart by the first distance in each of the first position and the second position.

6. The stand-on mower of claim 5, further comprising a height adjustment control drivingly coupled with the height adjustment linkage, the height adjustment control being effective to move the second portion relative to the first portion in the arc having the origin at the rear-drive element rotational axis between the first position and the second position.

7. The stand-on mower of claim 6, wherein the height adjustment control is a hand crank.

8. The stand-on mower of claim 6, wherein the height adjustment control is coupled with one or more of the frame and the drive linkage.

9. The stand-on mower of claim 1, wherein the drive linkage comprises a power transfer device drivingly coupling the powered-drive element with the rear-drive element.

10. The stand-on mower of claim 1, wherein the first portion comprises a frame couple with the pair of rear wheels.

11. A stand-on mower comprising:
a first portion comprising a pair of rear wheels, a frame, and a rear-drive element, the rear-drive element having a rear-drive element rotational axis;
a second portion comprising a mowing deck, a power source coupled with the mowing deck, and a powered-drive element, the powered-drive element having a powered-drive element rotational axis;
a drive linkage rotatably coupled with the first portion about the rear-drive element rotational axis and coupled with the second portion about the powered-drive element rotational axis, wherein the drive linkage maintains a first distance between the powered-drive element rotational axis and the rear-drive element rotational axis;
an operator platform coupled with one of the first portion and the second portion; and
a height adjustment linkage having a first height adjustment link rotatably coupled with the first portion at a first height adjustment link first pivot joint and rotatably coupled with the second portion at a first height adjustment link second pivot joint, wherein the first height adjustment link first pivot joint and the first height adjustment link second pivot joint are spaced apart by the first distance,
wherein the second portion is movable relative to the first portion in an arc having a radius equal to the first distance between a first position and a second position,
wherein the stand-on mower comprises a zero-turn stand-on mower.

12. The stand-on mower of claim 11, further comprising a second height adjustment link rotatably coupled with the first portion at a second height adjustment link first pivot joint and rotatably coupled with the second portion at a second height adjustment link second pivot joint, the second height adjustment link first pivot joint and the second height adjustment link second pivot joint being spaced apart by the first distance.

13. The stand-on mower of claim 12, wherein the second height adjustment link first pivot joint is positioned forward of the first height adjustment link second pivot joint.

14. The stand-on mower of claim 13, further comprising a connecting arm connecting the first height adjustment link and the second height adjustment link.

15. The stand-on mower of claim 11, further comprising a height adjustment control drivingly coupled with the height adjustment linkage, the height adjustment control being effective to move the second portion relative to the first portion in the arc having the radius equal to the first distance between the first position and the second position.

16. The stand-on mower of claim 11, wherein at least a portion of the operator platform is positioned below the rear-drive element rotational axis.

17. The stand-on mower of claim 11, further comprising a control tower coupled with one of the first portion and the second portion.

18. A stand-on mower comprising:
a first portion comprising a pair of rear wheels, a frame, and a rear-drive element, the rear-drive element having a rear-drive element rotational axis;
a second portion comprising a mowing deck, a power source coupled with the mowing deck, and a powered-drive element, the powered-drive element having a powered-drive element rotational axis;

a drive link rotatably coupled with the first portion about the rear-drive element rotational axis and coupled with the second portion about the powered-drive element rotational axis, wherein the drive link maintains a first distance between the powered-drive element rotational axis and the rear-drive element rotational axis; and an operator platform coupled with one of the first portion and the second portion, wherein the second portion is movable relative to the first portion in an arc having a radius equal to the first distance between a first position and a second position, wherein the stand-on mower comprises a zero-turn stand-on mower.

19. The stand-on mower of claim 18, further comprising a front link rotatably coupled with the first portion and the second portion at a position forward of the drive link.

20. The stand-on mower of claim 18, further comprising an intermediate-drive element coupling the rear-drive element and the powered-drive element.

* * * * *